US010938830B2

United States Patent
Fox et al.

(10) Patent No.: US 10,938,830 B2
(45) Date of Patent: Mar. 2, 2021

(54) AUTHORIZING AND NULLIFYING COMMANDS ISSUED TO VIRTUAL ASSISTANTS IN AN INTERNET OF THINGS (IOT) COMPUTING ENVIRONMENT BASED ON HIERARCHAL USER ACCESS LEVELS

(71) Applicant: INTERNATIONAL BUSINESS MACHINES CORPORATION, Armonk, NY (US)

(72) Inventors: Jeremy R. Fox, Georgetown, TX (US); Andrew R. Jones, Round Rock, TX (US); Gregory J. Boss, Saginaw, MI (US); John E. Moore, Jr., Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 15/973,994

(22) Filed: May 8, 2018

(65) Prior Publication Data
US 2019/0349385 A1 Nov. 14, 2019

(51) Int. Cl.
*H04L 29/06* (2006.01)
*H04L 29/08* (2006.01)

(52) U.S. Cl.
CPC .......... *H04L 63/105* (2013.01); *H04L 63/20* (2013.01); *H04L 67/125* (2013.01)

(58) Field of Classification Search
CPC ............ H04L 63/0209; H04L 12/2803; H04L 67/125; H04W 4/80
USPC .......................................................... 726/1
See application file for complete search history.

(56) References Cited

U.S. PATENT DOCUMENTS

| 6,119,088 | A | 9/2000 | Ciluffo |
| 6,158,005 | A | 12/2000 | Bharathan et al. |
| 7,620,549 | B2 | 11/2009 | Di Cristo et al. |
| 9,772,612 | B2 | 9/2017 | McCarthy, III et al. |
| 10,505,924 | B1* | 12/2019 | Barakat ............. H04W 12/0609 |
| 2002/0072912 | A1 | 6/2002 | Yen et al. |
| 2009/0183165 | A1 | 7/2009 | Gorin et al. |
| 2012/0239173 | A1 | 9/2012 | Laikari et al. |
| 2013/0346067 | A1 | 12/2013 | Bhatt |
| 2014/0278435 | A1 | 9/2014 | Ganong, III et al. |
| 2015/0162006 | A1 | 6/2015 | Kummer |
| 2016/0241439 | A1* | 8/2016 | Idnani ................. H04L 41/0816 |
| 2016/0359664 | A1* | 12/2016 | Malegaonkar ............ G06F 8/34 |

(Continued)

OTHER PUBLICATIONS

Rogers, "TV news report prompts viewers' Amazon Echo devices to order unwanted dollhouses," Fox News, www.foxnews.com/tech/2017/01/06/tv-news-report-prompts-viewers-amazon-echo-devices-to-order-unwanted-dollhouses.html, Jan. 6, 2017 (1 page).

*Primary Examiner* — Bryan F Wright
(74) *Attorney, Agent, or Firm* — Griffiths & Seaton PLLC

(57) ABSTRACT

Various embodiments are provided for nullifying commands in an Internet of Things (IoT) computing environment by a processor. One or more authorized commands may be defined for each authorization level in a hierarchy of authorization levels for accessing data, services, or resources in the IoT computing environment via an IoT device. One or more users may be assigned to one of the authorization levels in the hierarchy of authorization levels. A command issued to the IoT device from the one or more users may be nullified according to the assigned authorization level.

17 Claims, 7 Drawing Sheets

(56) References Cited

U.S. PATENT DOCUMENTS

2017/0041316 A1* 2/2017 Setchell .................. H04W 4/80
2017/0105171 A1* 4/2017 Srivastava .............. H04W 4/70
2017/0111373 A1* 4/2017 Morton ............... H04L 63/0209
2017/0230461 A1* 8/2017 Verma ................. H04L 12/2803
2018/0176196 A1* 6/2018 Smith ................... H04L 67/125

* cited by examiner

AUTHORIZING AND NULLIFYING COMMANDS ISSUED TO VIRTUAL ASSISTANTS IN AN INTERNET OF THINGS (IOT) COMPUTING ENVIRONMENT BASED ON HIERARCHAL USER ACCESS LEVELS

BACKGROUND OF THE INVENTION

Field of the Invention

The present invention relates in general to computing systems, and more particularly, to various embodiments for nullifying commands in an Internet of Things (IoT) computing environment using a computing processor.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities and simplifying the sharing of information.

Computing systems can include an Internet of Things (IoT), which is the interconnection of computing devices scattered across the globe using the existing Internet infrastructure. That is, IoT is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure. As great strides and advances in technologies come to fruition, the greater the need to make progress in these systems advantageous for efficiency and improvement.

SUMMARY OF THE INVENTION

Various embodiments are provided for nullifying commands in an Internet of Things (IoT) computing environment by a processor. One or more authorized commands may be defined for each authorization level in a hierarchy of authorization levels for accessing data, services, or resources in the IoT computing environment via an IoT device. One or more users may be assigned to one of the authorization levels in the hierarchy of authorization levels. A command issued to the IoT device from the one or more users may be nullified according to the assigned authorization level.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
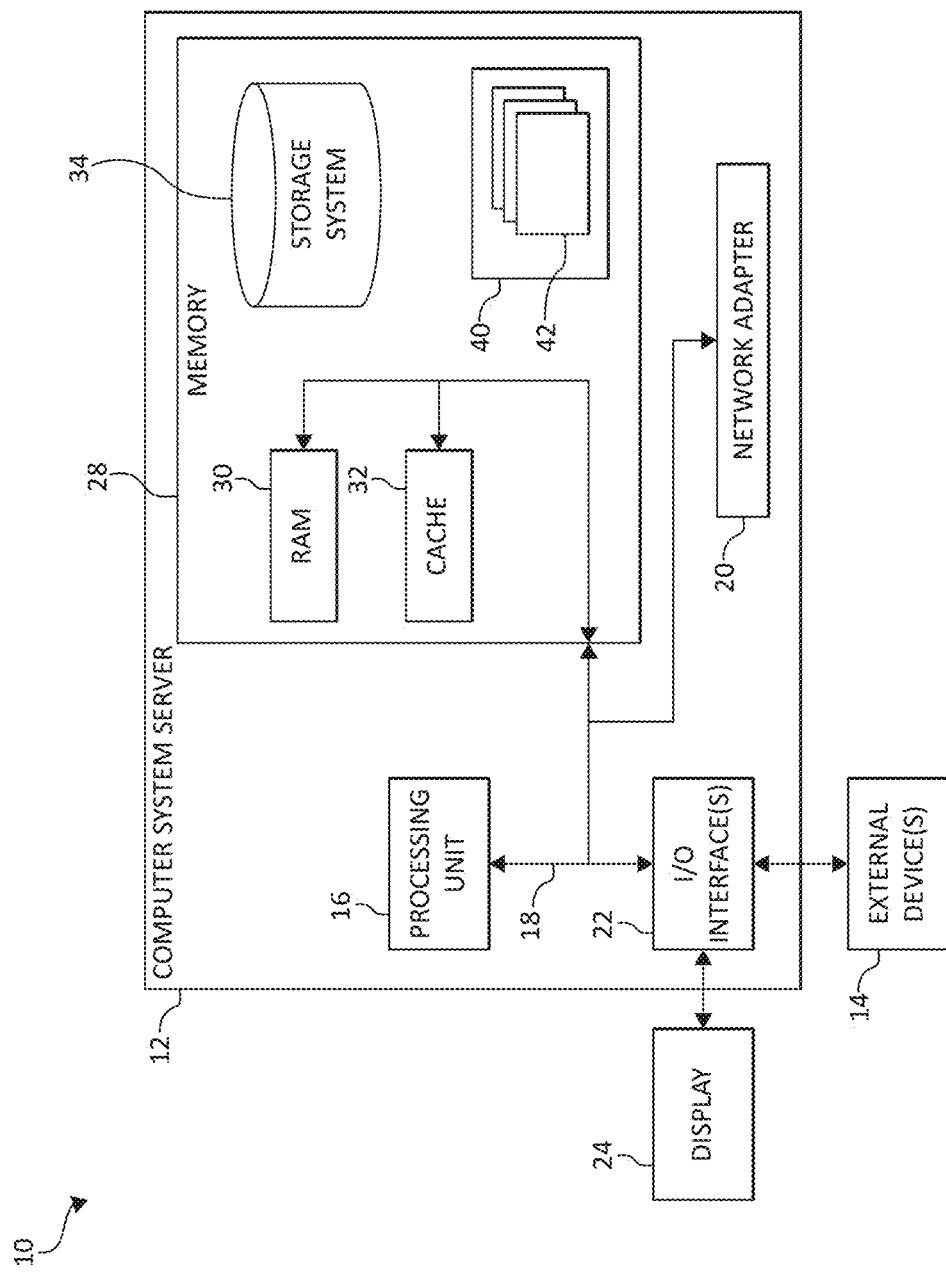
FIG. 1 is a block diagram depicting an exemplary computing node according to an embodiment of the present invention.

Computing systems may include large scale computing called "cloud computing", in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smartphones, laptops, voice-activated devices, digital assistants, home appliances, audio systems, televisions, security cameras, security sensors, among countless other examples. Such IoT computing systems may be employed in a variety of settings.

For example, digital assistance usage has dramatically increased over the past few years. Moreover, usage of always-on listening devices (e.g., voice-activated devices) has also increased in homes, buildings, and other types of structures or environments. However, a need exists to enable digital assistants to provide adequate security for the authorization of certain types of commands issued from users. Accordingly, various embodiments provide a cognitive system that may distinguish between users and provide allowance and authorization to each of the users as commands are issued by the users to the cognitive system.

In one aspect, the present invention provides for a cognitive system that may employ one or more machine learning operations and learning capabilities to authorize or nullify commands in an Internet of Things (IoT) computing environment by a processor. One or more authorized commands may be defined for each authorization level in a hierarchy of authorization levels for accessing data, services, or resources in the IoT computing environment via an IoT device. One or more users may be assigned to one of the authorization levels in the hierarchy of authorization levels. A command issued to the IoT device from the one or more users may be nullified according to the assigned authorization level.

In an additional aspect, each command/request(s) (e.g., voice issued command to a voice-activated device) issued by a user may be verified and/or authorized according to an assigned authorization level. In this way, each command issued by a user that is assigned to an authorization level without privileges to issue that particular type of command is nullified or rejected, which may be in real time. In one aspect, one or more voice-activated devices may be enabled to listen and identify a user according to an issued voice command and the voice-activated devices may also interact with primary and/or secondary users according to a classification and assignment of each type of command to an authorization level in the hierarchy of authorization levels.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more events, operations, or processes. Thus, the cognitive model may, over time, develop semantic labels and keywords to apply to observed behavior, authentication levels, commands, and use a knowledge domain or ontology to store the learned observed behavior, authentication levels, and commands. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems, as described herein, are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
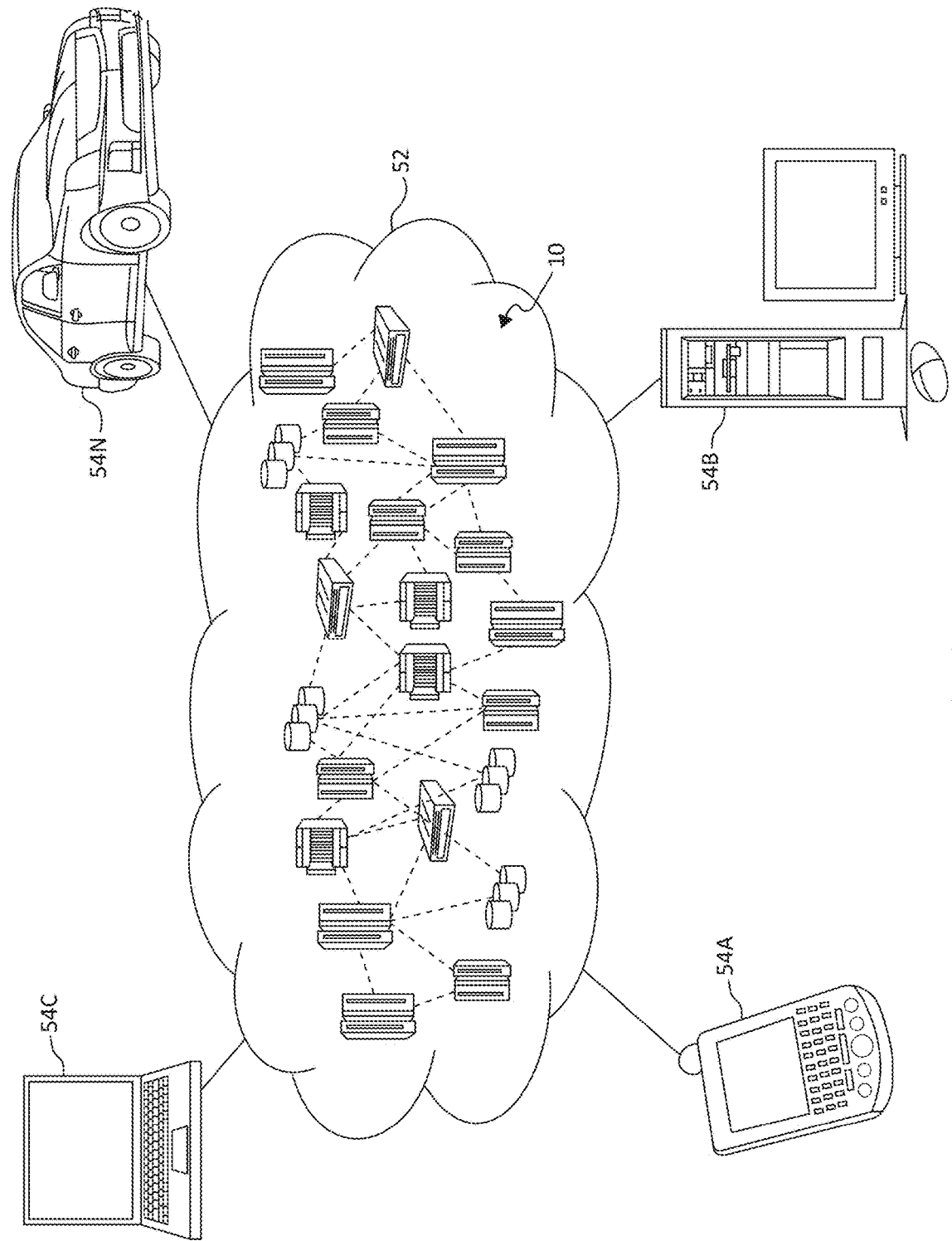
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
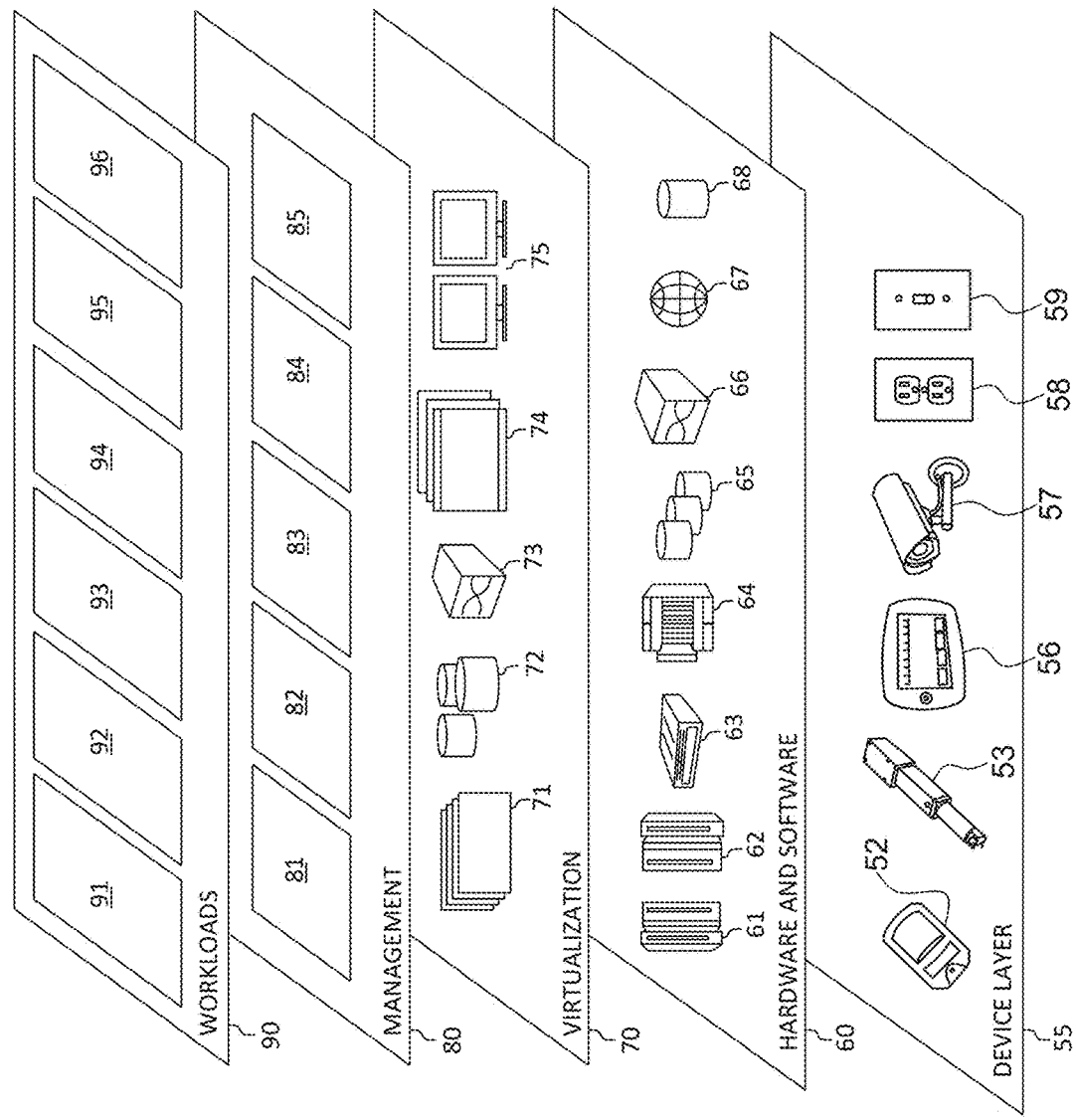
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for nullifying and/or approving commands. In addition, the workloads and functions 96 for nullifying and/or approving commands may include such operations as data analytics, data analysis, and as will be further described, notification functionality. One of ordinary skill in the art will appreciate that the workloads and functions 96 for nullifying and/or approving commands may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for nullifying and/or approving commands in an IoT computing environment. A hierarchy of commands may be established for assigned priorities and/or user assigned categories within an IoT device (e.g., a digital assistant device). A command may be nullified based on a multi-user, multi-variant analysis of user assigned priorities/categories and proximity relationships. An awareness or presence of one or more users within a defined proximity or location of an IoT device may be identified, authenticated and/or established for receiving one or more commands from the users. That is, the physical awareness of a user present within a defined proximity or location (e.g., an office conference room) of an IoT device may be defined and/or tracked. Also, a virtual awareness of a user present (e.g., detection of an electronic device) in association with an IoT device may be defined and/or tracked by use of a media device (e.g., audio and/or visual means).

Figure 4:
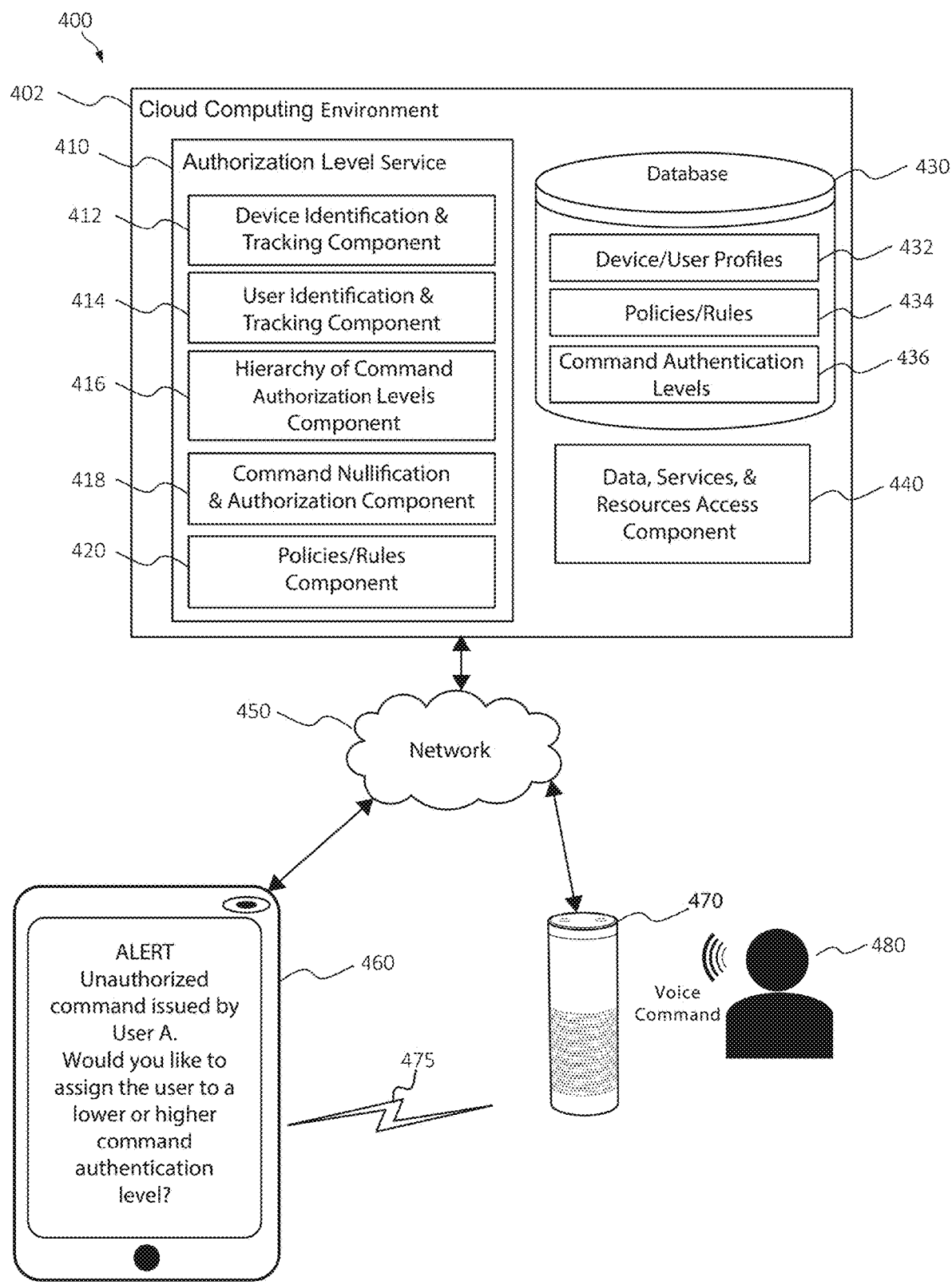
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates cognitive data curation workloads and functions and training of a machine learning model in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational data processing and other functionality in accordance with various aspects of the present invention.

The system 400 may include the cloud computing environment 402, an authorization level service 410, one or more IoT devices 470 (e.g., a digital assistant), and one or more devices such as, for example, device 460 (e.g., a desktop computer, laptop computer, tablet, smartphone, and/or another electronic device that may have one or more processors and memory). The device 460, the IoT devices 470, the authorization level service 410, and the computing environment 402 may each be associated with and/or in communication with each other, by one or more communication methods, such as a computing network 450. In one example, the device 460, the IoT devices 470, the authorization level service 410, and the computing environment 402 may be controlled by an owner, customer, or technician/administrator associated with the computing environment 402. In another example, device 460, the IoT devices 470, the authorization level service 410, and the computing environment 402 may be completely independent from the owner, customer, or user of the computing environment 402.

In one aspect, the computing environment 402 may provide virtualized computing services (i.e., virtualized computing, virtualized storage, virtualized networking, etc.) to device 460 and/or the IoT devices 470. More specifically, the computing environment 402 may provide virtualized computing, virtualized storage, virtualized networking and other virtualized services that are executing on a hardware substrate. In one aspect, the one or more IoT devices 470 may communicate with the device 460 using network 450. Also, the one or more IoT devices 470 may communicate with the device 460 using one or more communication connections such as, for example, a Wi-Fi Internet connection 475.

As depicted in FIG. 4, the computing environment 402 may include the authorization level service 410, a database 430, and/or a data, services, and resources access component 440. The database 430 may also include device/user profiles 432, one or more policies/rules 434, and command authorization levels 436 for the device 460, the IoT devices 470, and/or the users 480. The database 430 may store, maintain, and update policies/rules 434 that define one or more parameters for accessing data, services, and/or resources internal to and/or external to the cloud computing environment 402. The database 430 may store, maintain, and update device identification and authorization information and/or biometric identification (ID) data associated with the device/user profiles 432, such as, for example, voice data, fingerprint data, and/or retinal data.

In one aspect, the data, services, and resources access component 440 may assist in providing access to and/or assist in performing one or more various types of data, services and/or resources. In one aspect, the data, services and/or resources may include, for example, but are not limited to, data content associated with a user, a device or a command, identifying a speaker during a conference call via audio or visual means, calendaring services, scheduling conference calls or meetings, a scheduling assistant, editing, executing a command (e.g., "digital assistant please turn on lights in conference room B" or "digital assistant, please order more widgets") and/or updating calendars and/or phone directories, generating and/or sending e-mails, creating, ordering, scheduling, performing, and/or modifying one or more actions, services, tasks, or services, and so forth. In other words, the one or more data, services, and resources may include data content, services, actions, tasks, or resources that may be predefined, identified, or authorized for the data, services, and resources access component 440 to access, schedule, execute, and/or use.

In one aspect, the one or more IoT devices 470 may communicate with the device 460 using one or more communication connections such as, for example, a Wi-Fi Internet connection 475. The device 460 and the IoT devices 470 may communicate with the cloud computing environment 402 via the network 450 to send a unique device identification (ID) sent from the device 460 and/or an IoT identification (ID) that was received from the IoT device 470. That is, the device 460 and/or the IoT devices 470 may log into the computer environment 402, for the user 480, using various login credentials, which can include a user identification (ID), a unique device ID of the device 460 and/or the IoT device ID received from the IoT device 470. The unique device ID of the device 460 and/or the IoT device ID received from the IoT device 470 may be stored, maintained, and/or received in a device identification and tracking component 412 of the authorization level service 410. The user ID may be stored, maintained, and/or received in a user identification and tracking component 414 of the authorization level service 410.

The authorization level service 410 may provide a device identification and tracking component 412, a user identification (ID) and tracking component 414, a hierarchy of command authorization levels component 416, a command nullification and authorization component 418, and/or policies/rules component 420.

The device identification and tracking component 412 may define, establish, and track a physical presence of the one or more users within a defined proximity with the device and/or IoT device 470. The device identification and tracking component 412 may define, establish, and track a virtual presence of the one or more users 480 associated with the device 460 and/or IoT device 470.

The user ID and tracking component 414 may establish a physical or virtual awareness of user 480. Moreover, the user ID and tracking component 414 may also identify and authorize the user 480 for accessing, using, or executing a command in the cloud computing environment 402 for accessing data/content, services and/or resources provided by the data, services, and resources access component 440. For example, the user 480 may communicate voice commands to the IoT device 470. The cloud computing environment 402, in association with the IoT device 470, may identify the user 480 as the speaker (e.g., "speaker identification") or voice of the issued command. For example, using the embodiments described herein, the cloud computing environment 402 and/or the user ID and tracking component 414 can identify the user 480 speaking when one or more persons connect from each customer's own device (laptop, tablet, phone) such as, for example, device 460 and/or via the IoT device 470. By establishing the authenticated identity, which may include the identification for each user, such as user 480, the cloud computing environment 402, the user ID and tracking component 414, and/or the device 460/IoT device 470 (each having the authorized identity) can identify which user issued a voice command.

The hierarchy of command authorization levels component 416 may define a hierarchy of commands authorization levels. Each authorization level may be associated with one or more types of commands allowed to be requested by user 480 and/or performed or executed on behalf of user 480. That is, the hierarchy of command authorization levels component 416 may define an authorized command to each authorization level according to a sensitivity level and/or a category. The hierarchy of command authorization levels component 416 may also assign an authorization level for the user 480. The hierarchy of command authorization levels component 416 may enable an administrator to assign a specific authorization level for the user 480. Also, the hierarchy of command authorization levels component 416 may assign either a default authorization level or a selected authorization level in the hierarchy of authorization levels according to an authentication operation for the user 480. For example, if user 480 is a new user and/or an unauthorized user, a defined default value may be assigned such as, for example, a lowest authorization level in the hierarchy of command authorization levels to provide minimal or limited commands. The assigned authorization levels may be stored, maintained, updated, or modified as the command authentication levels 436 in database 430.

The hierarchy of command authorization levels component 416 may also suspend and/or restrict the assigned authorization level 436 in the hierarchy of authorization levels according to the defined policies/rules 434 in database 430. The hierarchy of command authorization levels component 416 may also promote and/or demote the one or more users to a different authorization level in the hierarchy of authorization levels according to the defined policies/rules 434 in database 430.

The command nullification and authorization component 418 may nullify and/or authorize a command issued to the IoT device 470 from a user such as, for example, user 480 according to the assigned authorization level 436. Using database 430, a look-up operation may be performed by the command nullification and authorization component 418 to determine the assigned authorization level 436 of user 480. If the assigned authorization level 436 fails to include the type of command associated with the command issued by the user 480, the command may be nullified. Alternatively, if the assigned authorization level 436 does include the type of command associated with the command issued by the user 480, the command may be authorized.

Figure 5:
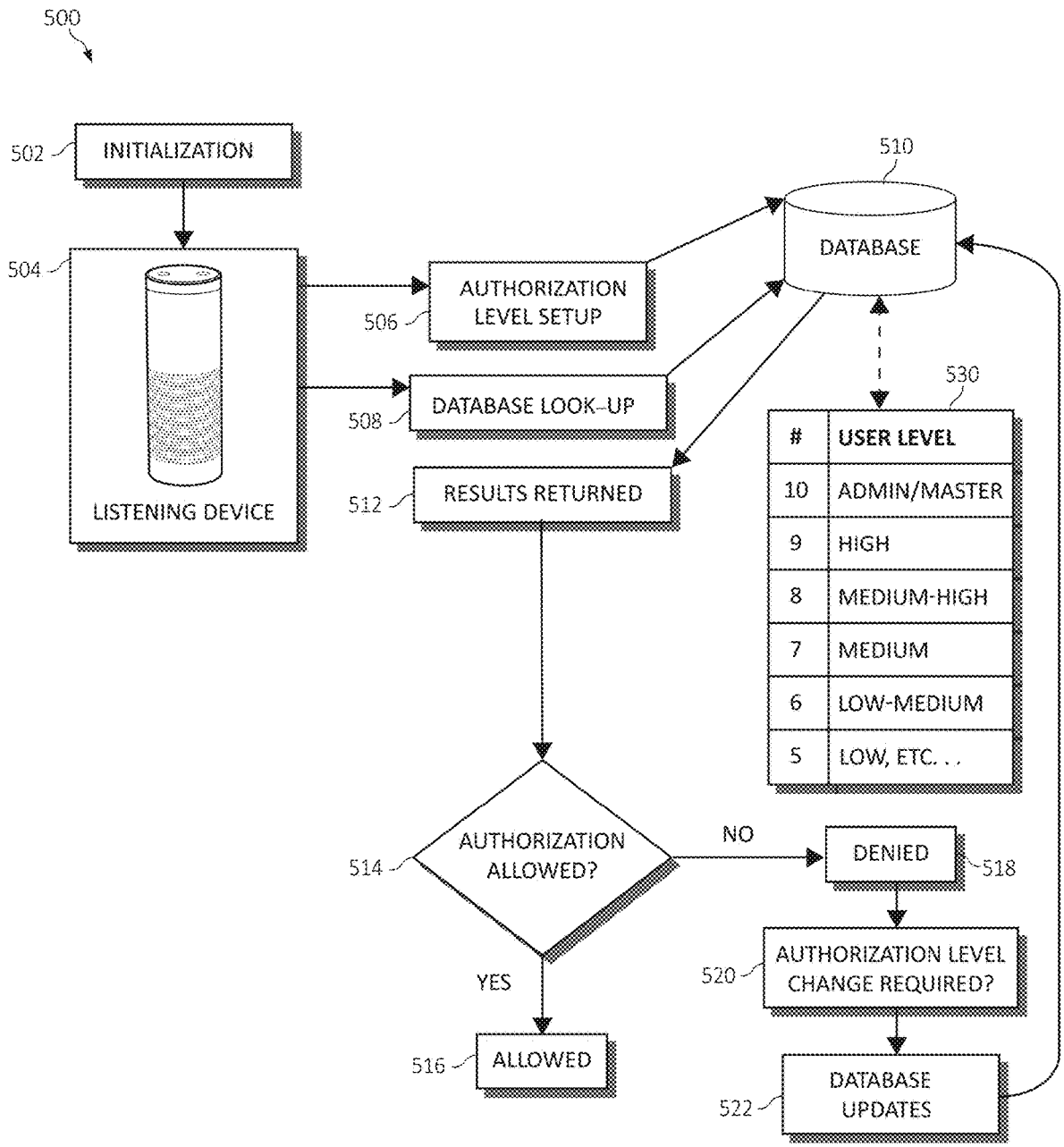
FIG. 5 is a block/flow diagram for nullifying commands in an Internet of Things (IoT) computing environment in accordance with an embodiment of the present invention.

Turning now to FIG. 5, a block diagram of exemplary functionality 500 relating to nullifying commands in an IoT computing environment is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for image enhancement in accordance with the present invention such as, for example, hardware and software components of FIG. 4. Many of the functional blocks 500 may execute as background processes on various components, either in distributed computing components, or on the user device, or elsewhere.

Starting with block 502, an initialization operation may be performed. That is, functional blocks 500 may define a context and scope for commands to be allowed or denied within an IoT device (e.g., a digital Assistant interface). A data utilization and setup operation may be performed. For example, as a primary operation, each of the commands may all be determined and listed and then assigned a sensitivity value to each command. As an alternative operation, each command may be assigned to a category (e.g. financial, public information, private information, calendar, orders and purchases, etc.). Each user may be assigned to an authorization level.

Furthermore, an initialization set up may be performed for each new user or upon first time usage of an IoT device 504 by a user. The functional blocks 500 may dynamically set up (e.g., define, establish, and/or assign) the new user to an appropriate or selected level of authorization (e.g., user level 530) or value, as in block 506. For example, each authorization level of user levels 530 may be assigned from a value such as, for example, a numerical value (e.g., 1-10) with 1 representing the lowest authorization level and 10 representing a highest authorization level. Authorization level 1 or "user level 1" may be an authorization level having the least amount of commands associated therewith as compared to the authorization level 10 or "user level 10" which may have the greatest amount of commands associated therewith (e.g., a master user or administrator). In one aspect, the administrator or "master user" may also define, establish, and/or assign a new user to an appropriate or selected level of authorization. The administrator or "master user" may initially assign and/or reassign other users to one or more alternative authorization levels.

Upon the system or the master/administrator user completing an initial operation for the new user, the new user may be introduced to a computing system by completing a voice recognition process with the system. Furthermore, as an additional embodiment, each new user may be automatically assigned to the lowest authorization level or value (e.g., user level "1") in the hierarchy of authorization levels and may only be promoted by primary master user(s) upon initialization. The primary master user may introduce the new user to an IoT device 504 and assign the new user to the defined user level. Each authorization level assignment provides one or more rights and privileges for the user upon entry or assignment to the assigned authorization level. Any user that is not properly authenticated, may receive the default user authorization level 1 (e.g., a lowest level with the least amount of rights, privileges, and/or associated commands).

Again, as in block 502, as part of the initialization operation, a security and authentication may be confirmed as having been completed or occurred (for each individual user). For example, each user may be authenticated based on digital voice patterns, biometric data, and digital voice prints.

As in block 506, a user may be assigned an authorization level (e.g., authorization level setup). For example, each user may be assigned an authorization value (e.g., upon entry to a home, conference call, meeting, building associated with the IoT device 504). For example, the authorization levels may be defined as:
User Level #10=Master User(s) primary and backup master users;
User Level #9=Family: spouse, parents;
User Level #8=Family: children equal to or over the age of 12;
User Level #7=Family: children equal to or younger than the age of 11;
User Level #6=Friends: best friend;
User Level #5=Friends: broad access;
User Level #4=Friends: basic access;
User Level #3=Repeating Guests;
User Level #2=One Time User/Guest; and/or
User Level #1=New Users (Default).

Furthermore, the IoT device 504 may also monitor, determine, and/or identify each user that may enter or comes within a defined proximity (e.g., a "voice distance") based on one or more criteria. For example, a user with user level 7 access may be granted elevated rights to user level 8 when a parent (level 9 or 10) is present, but fully restricted to level 7 access when a parent is not present or detected. In an additional example, a user having an assigned user level (e.g., user level 8) may be restricted or reassigned to a lower user level (e.g., user level 7) if a defined number (e.g., three or more) users having a similar assigned user level (e.g., three user level 8s) are in a same physical or virtual proximity to the IoT device 504.

Turning now to block 508, a database look-up command may be performed in database 510 on the user authorization level. That is, the database look-up command may be performed to determine the user authorization level. In one aspect, a database look-up command may include comparing the assigned sensitivity level of the user to the sensitivity level of the issued command. Alternatively, the assigned category level of the user may be compared to the category level of the issued command.

As in block 512, an authorization determination result (e.g., decision) may be provided (e.g., returned to the IoT device 504). A determination operation may be performed to determine if the authorization was allowed (or nullified), as in block 514. That is, the authorization for execution of the command may be allowed, denied, and/or changed. If the command is allowed for the user, the user may be allowed to access or reference the content, services, and/or resources for the command, as in block 516. If the command is denied for the user, the user is restricted from accessing and/or not allowed to access the content, services, and/or resources associated with the issued command, as in block 518.

An additional operation may be performed to determine whether or not the authorization level for the user is required to be changed, as in block 520. If the authorization level is to be changed, a user may be promoted or demoted from one level of sensitive value or category. The database 510 may be updated with the new assigned authorization level for the user, as in block 522. That is, the database 510 may setup and iteratively maintain keywords in the database 510 (e.g., a keyword database) for content, services, and/or resources authorization levels for both the sensitivity values and the categorization values associated with each authentication level in the hierarchy of authentication levels. A master/administrator user may be enabled to add, delete, edit, and/or modify an authorization level of a new or existing user in the database 510.

Figure 6:
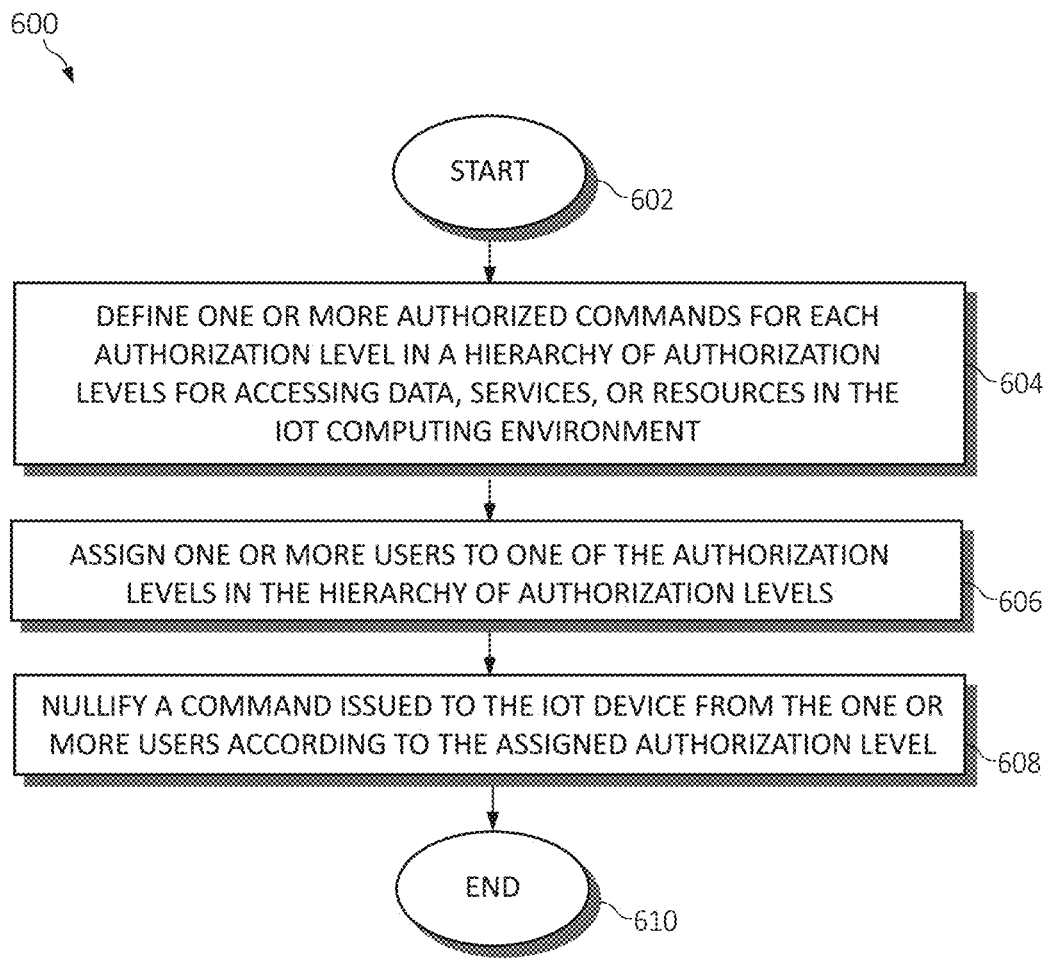
FIG. 6 is a flowchart diagram depicting an exemplary method for nullifying commands in an Internet of Things (IoT) computing environment in accordance with an embodiment of the present invention.

Turning now to FIG. 6, a method 600 is illustrated for nullifying commands in an IoT computing environment, in which various aspects of the illustrated embodiments may be implemented. The functionality 600 may be implemented as a method executed as instructions on a machine, where the instructions are included on at least one computer readable medium or on a non-transitory machine-readable storage medium.

The functionality 600 may start in block 602. One or more authorized commands may be defined for each authorization level in a hierarchy of authorization levels for accessing data, services, or resources in the IoT computing environment via an IoT device, as in block 604. One or more users may be assigned to one of the authorization levels in the hierarchy of authorization levels, as in block 606. A command issued to the IoT device from the one or more users may be nullified according to the assigned authorization level, as in block 608. The functionality 600 may end in block 610.

Figure 7:
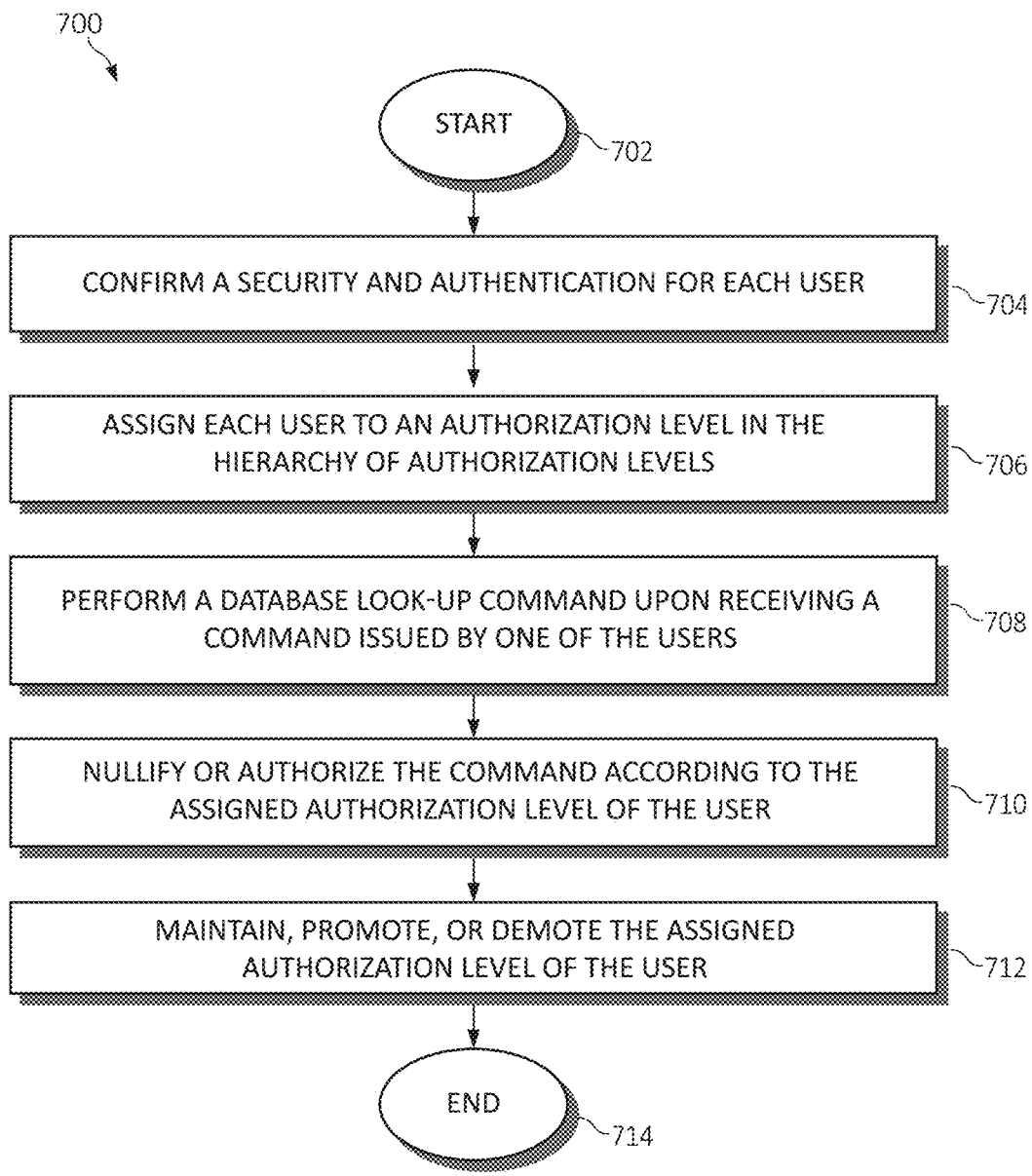
FIG. 7 is a flowchart diagram depicting an additional exemplary method for nullifying commands in an Internet of Things (IoT) computing environment in accordance with an embodiment of the present invention.

Turning now to FIG. 7, an additional method 700 is illustrated for nullifying commands in a computing environment, in which various aspects of the illustrated embodiments may be implemented. The functionality 700 may be implemented as a method executed as instructions on a machine, where the instructions are included on at least one computer readable medium or on a non-transitory machine-readable storage medium.

The functionality 700 may start in block 702. A security and authentication may be confirmed for each user, as in block 704. Each user may be assigned to an authorization level in the hierarchy of authorization levels, as in block 706. A database look-up command may be performed upon receiving a command issued by one of the users, as in block 708. The command may be nullified or authorized according to the assigned authorization level of the user, as in block 710. The assigned authorization level of the user may be maintained, promoted, or demoted, as in block 712. The functionality 700 may end in block 714.

In one aspect, in conjunction with and/or as part of at least one block of FIGS. 6-7, the operations of 600 and/or 700 may include each of the following. The operations of 600 and/or 700 may define an authorized command to an authorization level according to a sensitivity level or define an authorized command to an authorization level according to a category. The assigned authorization level may be determined for the one or more users issuing the command to the IoT device. A new user may be assigned to either a default authorization level or a selected authorization level in the hierarchy of authorization levels according to an authentication operation.

The operations of 600 and/or 700 may define and track a physical presence of the one or more users within a defined proximity with the IoT device, and/or define and track a virtual presence of the one or more users with the IoT device.

The operations of 600 and/or 700 may suspend or restrict the assigned authorization level in the hierarchy of authorization levels according to a plurality of defined rules and policies, and/or promote or demote the one or more users to a different authorization level in the hierarchy of authorization levels according to a plurality of defined rules and policies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, by a processor, for nullifying commands in an Internet of Things (IoT) computing environment, comprising:
    defining one or more authorized commands for each authorization level in a hierarchy of authorization levels for accessing data, services, or resources in the IoT computing environment via an IoT device;
    assigning one or more users to one of the authorization levels in the hierarchy of authorization levels, wherein assigning the authorization levels includes assigning a first user of the one or more users a first authorization level and a second user of the one or more users a second authorization level, the second authorization level higher than the first authorization level;
    receiving a command commensurate with the second authorization level issued to the IoT device by the first user; wherein the first user and the second user are both determined to be within a predefined physical proximity of the IoT device during the issuance of the command;
    determining the assigned authorization level for the first user issuing the command to the IoT device, wherein determining the assigned authorization level includes determining the first user is authorized to issue the command commensurate with the second authorization level only when the second user is within the predefined physical proximity of the IoT device; and
    authorizing and performing the command issued to the IoT device from the first user according to the determination.

2. The method of claim 1, wherein defining the one or more authorized commands for each authorization level further includes:
    defining an authorized command to an authorization level according to a sensitivity level; or
    defining an authorized command to an authorization level according to a category.

3. The method of claim 1, further including
    defining and tracking a virtual presence of the one or more users with the IoT device.

4. The method of claim 1, further including assigning a new user to either a default authorization level or a selected authorization level in the hierarchy of authorization levels according to an authentication operation.

5. The method of claim 1, further including suspending or restricting the assigned authorization level in the hierarchy of authorization levels according to a plurality of defined rules and policies.

6. The method of claim 1, further including promoting or demoting the one or more users to a different authorization level in the hierarchy of authorization levels according to a plurality of defined rules and policies.

7. A system, for nullifying commands in an Internet of Things (IoT) computing environment, comprising:
    one or more processors; and
    one or more memory devices each in communication with the one or more processors, wherein the one or more memory devices store executable instructions that when executed by the one or more processors cause the system to:
    define one or more authorized commands for each authorization level in a hierarchy of authorization levels for accessing data, services, or resources in the IoT computing environment via an IoT device;
    assign one or more users to one of the authorization levels in the hierarchy of authorization levels, wherein assigning the authorization levels includes assigning a first user of the one or more users a first authorization level and a second user of the one or more users a second authorization level, the second authorization level higher than the first authorization level;
    receive a command commensurate with the second authorization level issued to the IoT device by the first user; wherein the first user and the second user are both determined to be within a predefined physical proximity of the IoT device during the issuance of the command;
    determine the assigned authorization level for the first user issuing the command to the IoT device, wherein determining the assigned authorization level includes determining the first user is authorized to issue the command commensurate with the second authorization level only when the second user is within the predefined physical proximity of the IoT device; and
    authorize and perform the command issued to the IoT device from the first user according to the determination.

8. The system of claim 7, wherein the executable instructions further:
    define an authorized command to an authorization level according to a sensitivity level; or
    define an authorized command to an authorization level according to a category.

9. The system of claim 7, wherein the executable instructions further
    define and track a virtual presence of the one or more users with the IoT device.

10. The system of claim 7, wherein the executable instructions further assign a new user to either a default authorization level or a selected authorization level in the hierarchy of authorization levels according to an authentication operation.

11. The system of claim 7, wherein the executable instructions further suspend or restrict the assigned authorization level in the hierarchy of authorization levels according to a plurality of defined rules and policies.

12. The system of claim 7, wherein the executable instructions further promote or demote the one or more users to a different authorization level in the hierarchy of authorization levels according to a plurality of defined rules and policies.

13. A computer program product for, by one or more processors, nullifying commands in an Internet of Things (IoT) computing environment, the computer program product comprising a non-transitory computer-readable storage medium having computer-readable program code portions stored therein, the computer-readable program code portions comprising:

an executable portion that defines one or more authorized commands for each authorization level in a hierarchy of authorization levels for accessing data, services, or resources in the IoT computing environment via an IoT device;

an executable portion that assigns one or more users to one of the authorization levels in the hierarchy of authorization levels, wherein assigning the authorization levels includes assigning a first user of the one or more users a first authorization level and a second user of the one or more users a second authorization level, the second authorization level higher than the first authorization level;

an executable portion that receives a command commensurate with the second authorization level issued to the IoT device by the first user; wherein the first user and the second user are both determined to be within a predefined physical proximity of the IoT device during the issuance of the command;

an executable portion that determines the assigned authorization level for the first user issuing the command to the IoT device, wherein determining the assigned authorization level includes determining the first user is authorized to issue the command commensurate with the second authorization level only when the second user is within the predefined physical proximity of the IoT device; and an executable portion that authorizes and performs the command issued to the IoT device from the first user according to the determination.

14. The computer program product of claim 13, further including an executable portion that:
  defines an authorized command to an authorization level according to a sensitivity level; or
  defines an authorized command to an authorization level according to a category.

15. The computer program product of claim 13, further including an executable portion that
  defines and tracks a virtual presence of the one or more users with the IoT device.

16. The computer program product of claim 13, further including an executable portion that assigns a new user to either a default authorization level or a selected authorization level in the hierarchy of authorization levels according to an authentication operation.

17. The computer program product of claim 13, further including an executable portion that:
  suspends or restricts the assigned authorization level in the hierarchy of authorization levels according to a plurality of defined rules and policies; or
  promotes or demotes the one or more users to a different authorization level in the hierarchy of authorization levels according to the plurality of defined rules and policies.

\* \* \* \* \*